(12) United States Patent
Wang et al.

(10) Patent No.: US 9,451,089 B2
(45) Date of Patent: Sep. 20, 2016

(54) CALLING CENTER SYSTEM AND CALLING PROCESSING METHOD THEREOF

(75) Inventors: Jingping Wang, Shenzhen (CN); Wenyuan Wang, Shenzhen (CN); Ling Jing, Shenzhen (CN); Wei Zhang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 14/126,483

(22) PCT Filed: Feb. 17, 2012

(86) PCT No.: PCT/CN2012/071276
§ 371 (c)(1),
(2), (4) Date: Dec. 16, 2013

(87) PCT Pub. No.: WO2012/171355
PCT Pub. Date: Dec. 20, 2012

(65) Prior Publication Data
US 2014/0126717 A1   May 8, 2014

(30) Foreign Application Priority Data

Jun. 15, 2011   (CN) .......................... 2011 1 0160872

(51) Int. Cl.
*H04M 3/00*   (2006.01)
*H04M 3/523*   (2006.01)
(Continued)

(52) U.S. Cl.
CPC ......... *H04M 3/5232* (2013.01); *H04M 3/5166* (2013.01); *H04M 3/523* (2013.01)

(58) Field of Classification Search
CPC .. H04M 3/5237; H04M 3/51; H04M 3/5175; H04M 3/5233; H04M 3/5125; H04M 3/42323; H04M 3/5183; H04M 2203/402; H04M 3/5166; H04M 3/523; H04M 3/5232; H04M 3/5191; H04M 29/06027; H04M 65/1006; H04M 65/1009; H04M 67/24; H04M 51/04; H04M 12/581; H04M 41/18; H04M 43/04; H04M 65/1073
USPC ........ 379/265, 266; 370/352, 353, 354, 355, 370/356, 357

See application file for complete search history.

(56) References Cited

U.S. PATENT DOCUMENTS 6,744,877 B1 * 6/2004 Edwards .................. 379/265.02
7,565,428 B2 * 7/2009 Deryugin et al. ............ 709/224
(Continued)

FOREIGN PATENT DOCUMENTS

| CN | 101146156 A | 3/2008 |
|---|---|---|
| CN | 101150419 A | 3/2008 |
| CN | 101483700 | 7/2009 |

OTHER PUBLICATIONS

International Search Report for corresponding application PCT/CN2012/071276 filed Feb. 17, 2012; Mail date May 24, 2012.

Primary Examiner — Fan Tsang
Assistant Examiner — Kharye Pope
(74) Attorney, Agent, or Firm — Cantor Colburn LLP (57) ABSTRACT

A calling center system and a calling processing method of a calling center system are provided in the disclosure. The calling center system includes: an accessing module, configured to receive a user call; multiple CCB units, wherein each CCB unit is configured to select one agent module for serving the user call from multiple agent modules corresponding to the CCB unit, wherein each agent module of the multiple agent modules is configured to serve a user call; a scheduling module, configured to select, according to capability data of the multiple CCB units, the one or more CCB units from the multiple CCB units to perform the operation of selecting one agent module for serving the user call, and select one agent module from one or more agent modules selected by the one or more CCB units to serve the user call. The disclosure can enhance the reliability of the system.

17 Claims, 10 Drawing Sheets

(51) Int. Cl.
*H04M 3/51* (2006.01)
*H04M 5/00* (2006.01)
*H04L 12/66* (2006.01)

(56) References Cited

U.S. PATENT DOCUMENTS

| | | | |
|---|---|---|---|
| 2003/0086554 A1* | 5/2003 | Krimstock et al. | 379/265.02 |
| 2004/0083195 A1* | 4/2004 | McCord | H04M 3/5233 706/47 |
| 2004/0240659 A1* | 12/2004 | Gagle et al. | 379/265.01 |
| 2005/0129217 A1* | 6/2005 | McPartlan | H04M 3/5232 379/266.08 |
| 2005/0148338 A1* | 7/2005 | Baumeister | H04M 3/4931 455/455 |
| 2005/0195960 A1* | 9/2005 | Shaffer et al. | 379/265.02 |
| 2006/0067506 A1* | 3/2006 | Flockhart et al. | 379/265.09 |
| 2006/0115072 A1* | 6/2006 | Kessinger et al. | 379/265.03 |
| 2007/0041527 A1* | 2/2007 | Tuchman | G06Q 30/0207 379/88.22 |
| 2007/0127690 A1* | 6/2007 | Patakula | H04M 3/5238 379/265.05 |
| 2009/0161858 A1* | 6/2009 | Goss et al. | 379/265.09 |
| 2010/0128720 A1* | 5/2010 | Goss | 370/352 |
| 2010/0266115 A1* | 10/2010 | Fedorov et al. | 379/265.12 |

* cited by examiner

CALLING CENTER SYSTEM AND CALLING PROCESSING METHOD THEREOF

TECHNICAL FIELD

The disclosure relates to the field of communications, and particularly, to a calling center system and a calling processing method of a calling center system.

BACKGROUND ART

A calling center system has been developed from the first generation to the current fifth generation and has been widely used in the banking industry, security industry, aviation industry and telecommunication industry. The capacity of agents of a calling center system increases from a few to tens of thousands, and in particular, applications in the telecommunication industry have increasingly high demand for the calling center system platform, and the capacity thereof is also growing.

Figure 1:
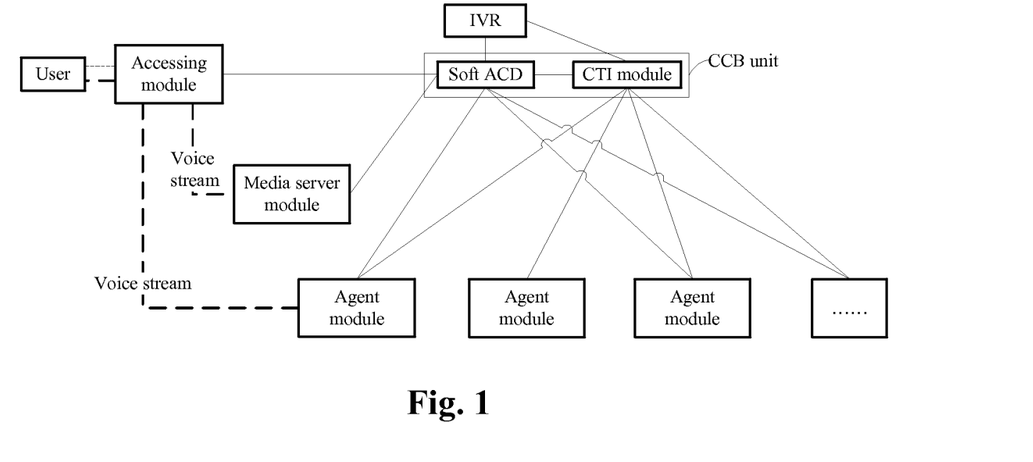
FIG. 1 is a schematic diagram of a calling center system according to the related arts.

FIG. 1 is a schematic diagram of a calling center system according to the related arts. As shown in FIG. 1, a calling center system consists of an accessing module, a cell control block (CCB) unit, a media server module, and agent modules. The accessing module is responsible for the connection of various types of user calls, media negotiation and interaction with the agent modules, and media stream negotiation and interaction with the media server module. The CCB unit consists of a soft automatic call distribution (Soft ACD) and a computer telephony integration (CTI) module, wherein the Soft ACD is responsible for call channel control, call resource information report and call number registration of the agent modules; the CTI module is responsible for accepting registration (service level information such as skills, priorities, etc.) from the agent modules, performing route queuing operation on a calling user from an interactive voice response (IVR) module according to policies, and finding a suitable agent module to serve this calling user. The IVR module is responsible for providing automatic service flow processing for the user, and initiating a route queuing request to the route queuing module according to user requirements. The media server module is controlled by the IVR module and the Soft ACD module, and is responsible for providing media resources for a user, such as playing audio, receiving numbers, and faxing, etc. An agent module is responsible for providing manual services for the user, and each agent module has corresponding service level information, such as skills, priorities, etc.

At present, in the era where the calling center system is widely used, the calling center system is increasingly centralized, such as China Telecom, China Mobile and some large foreign operators (e.g., Telfonica), and some operators require to reach at least 20,000 agents. However, the Soft ACD and the CTI module in the above-mentioned CCB unit is limited in processing capacity, which thereby causes the agents that can be accepted for registration in the calling center system to be always limited and makes it difficult to meet the conditions where the stretching scope of the agent capacity is large.

SUMMARY

The disclosure provides a calling center system and a calling processing method of a calling center system, so as to at least solve the problem that the processing capacity of a single CCB unit is limited, which thereby causes the agents that can be accepted for registration in the calling center system to be always limited and makes it difficult to meet the conditions where the stretching scope of the agent capacity is large.

In an aspect, the disclosure provides a calling center system.

The calling center system according to the disclosure includes: an accessing module, configured to receive a user call; multiple cell control block (CCB) units, wherein each CCB unit is configured to select one agent module for serving the user call from multiple agent modules corresponding to the CCB unit, wherein each agent module of the multiple agent modules is configured to serve a user call; and a scheduling module, configured to select, according to capability data of the multiple CCB units, one or more CCB units from the multiple CCB units to perform the operation of selecting one agent module for serving the user call, and select one agent module from one or more agent modules selected by the one or more CCB units to serve the user call.

The scheduling module includes: a first selection sub-module, configured to select, according to the capability data of the multiple CCB units, the one or more CCB units from the multiple CCB units to perform the operation of selecting one agent module for serving the user call; a first sending sub-module, configured to respectively send to the one or more CCB units a route queuing request corresponding to the user call; a first receiving sub-module, configured to receive a route queuing result from each CCB units of the one or more CCB units, wherein the route queuing result from each CCB unit includes the agent module for serving the user call selected by the CCB unit from the multiple agent modules corresponding to the CCB unit; and a second selection sub-module, configured to select one agent module from the one or more agent modules selected by the one or more CCB units to serve the user call.

Each CCB unit of the multiple CCB units includes: a second receiving sub-module, configured to receive the route queuing request from the scheduling module; a third selection sub-module, configured to select, according to the route queuing request, one agent module for serving the user call from the multiple agent modules corresponding to the CCB unit; and a second sending sub-module, configured to send the route queuing result to the scheduling module, wherein the route queuing result includes the agent module selected from the multiple agent modules.

The calling center system further includes an interactive voice response (IVR) module configured to initiate a route queuing request to the scheduling module according to the user call.

The scheduling module includes: a third receiving sub-module, configured to receive a login request from one or more agent modules among the multiple agent modules; and a resource scheduling sub-module, configured to select, according to the capability data, one CCB unit from the multiple CCB units to serve the login request.

Each CCB unit of the multiple CCB units further includes: a computer telephony integration (CTI) module, configured to receive the login request from the one or more agent modules; and a registration module, configured to register the one or more agent modules.

Each CCB unit of the multiple CCB units includes: a monitoring sub-module, configured to monitor capability data; and a third sending sub-module, configured to send the capability data to the scheduling module.

According to another aspect of the disclosure, a calling processing method of a calling center system is provided.

The calling processing method of a calling center system includes: an accessing module receiving a user call; a scheduling module selecting one or more cell control block (CCB) units from multiple CCB units according to capability data of the multiple CCB units; each CCB unit of the one or more CCB units respectively selecting one agent module for serving the user call from multiple agent modules corresponding to the CCB unit, wherein each agent module of the multiple agent modules is configured to serve a user call; and the scheduling module selecting one agent module from one or more agent modules selected by the one or more CCB units to serve the user call.

Before each CCB unit of the one or more CCB units respectively selects one agent module for serving the user call from multiple agent modules corresponding to the CCB unit, the method further includes: the one or more CCB units receiving from the scheduling module a route queuing request corresponding to the user call; and after each CCB unit of the one or more CCB units respectively selects one agent module for serving the user call from multiple agent modules corresponding to the CCB unit, the method further includes: each CCB unit of the one or more CCB units sending a route queuing result to the scheduling module, wherein the route queuing result from each CCB unit includes the agent module for serving the user call selected by the CCB unit.

Before the one or more CCB units receives from the scheduling module a route queuing request corresponding to the user call, the method further includes: an interactive voice response (IVR) module initiating a route queuing request to the scheduling module according to the user call.

Before the scheduling module selects the one or more CCB units from the multiple CCB units according to the capability data of the multiple CCB units, the method further includes: the scheduling module receiving capability data monitored by each CCB unit of the multiple CCB units.

In the disclosure, the number of the multiple CCB units can be expanded or reduced arbitrarily as required. Meanwhile, through the scheduling of the CCB units by a scheduling module, the parallel service of the multiple CCB units can also enhance the reliability of the system.

BRIEF DESCRIPTION OF THE DRAWINGS

Drawings, provided for further understanding of the disclosure and forming a part of the specification, are used to explain the disclosure together with embodiments of the disclosure rather than to limit the disclosure. In the drawings.

DETAILED DESCRIPTION OF THE EMBODIMENTS

It should be noted that the embodiments of the disclosure and the features of the embodiments can be combined with each other if there is no conflict. The disclosure will be explained in detail below with reference to the drawings and in conjunction with the embodiments.

Figure 2:
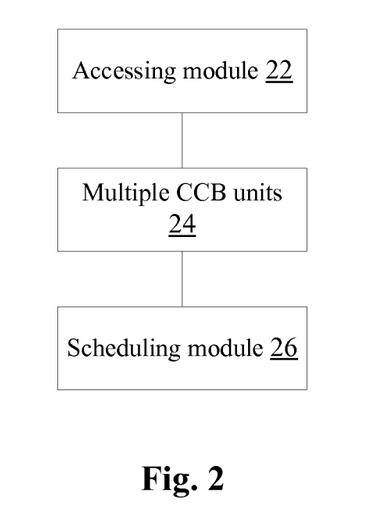
FIG. 2 is a block diagram of the structure of a calling center system according to an embodiment of the disclosure.

An embodiment of the disclosure provides a calling center system. FIG. 2 is a block diagram of the structure of a calling center system according to an embodiment of the disclosure. As shown in FIG. 2, the calling center system includes an accessing module 22, multiple CCB units 24, and a scheduling module 26. The structure thereof is described in detail below.

The accessing module 22 is configured to receive a user call; the multiple CCB units 24 are coupled with the accessing module 22, wherein each CCB unit is configured to select, from multiple agent modules corresponding to the CCB unit, one agent module for serving the user call received by the accessing module 22, wherein each agent module of the multiple agent modules is configured to serve a user call; the scheduling module 26 is coupled with the accessing module 22 and the multiple CCB units 24 and is configured to select, according to the capability data of the multiple CCB units 24, one or more CCB units from the multiple CCB units 24 to perform the operation of selecting one agent module for serving the user call, and select one agent module from the one or more agent modules selected by the one or more CCB units to serve the user call received by the accessing module 22.

In the related arts, the processing capacity of the CCB units is limited, thereby causing the agents that can be accepted for registration in the calling center system to be always limited and making it difficult to meet the conditions where the stretching scope of the agent capacity is large. In the embodiment of the disclosure, the number of the multiple CCB units can be expanded or reduced arbitrarily as required, and meanwhile, through the scheduling of the CCB units by a scheduling module, the parallel service of the multiple CCB units can also enhance the reliability of the system.

Figure 3:
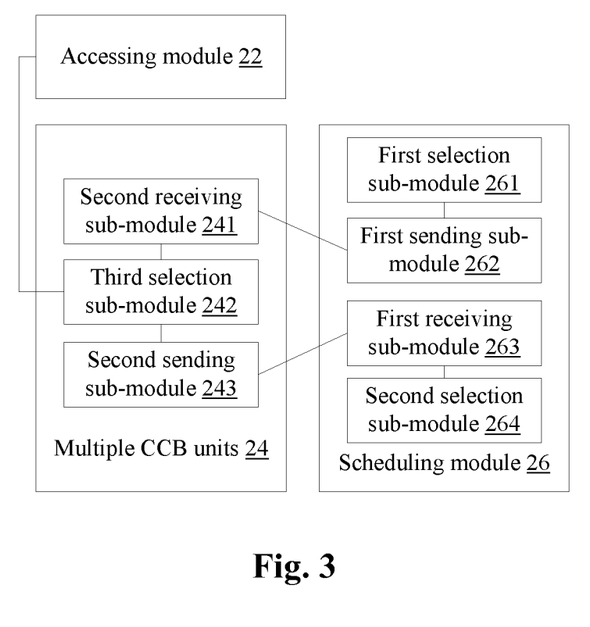
FIG. 3 is block diagram I of the structure of a calling center system according to a preferred embodiment of the disclosure.
Figure 4:
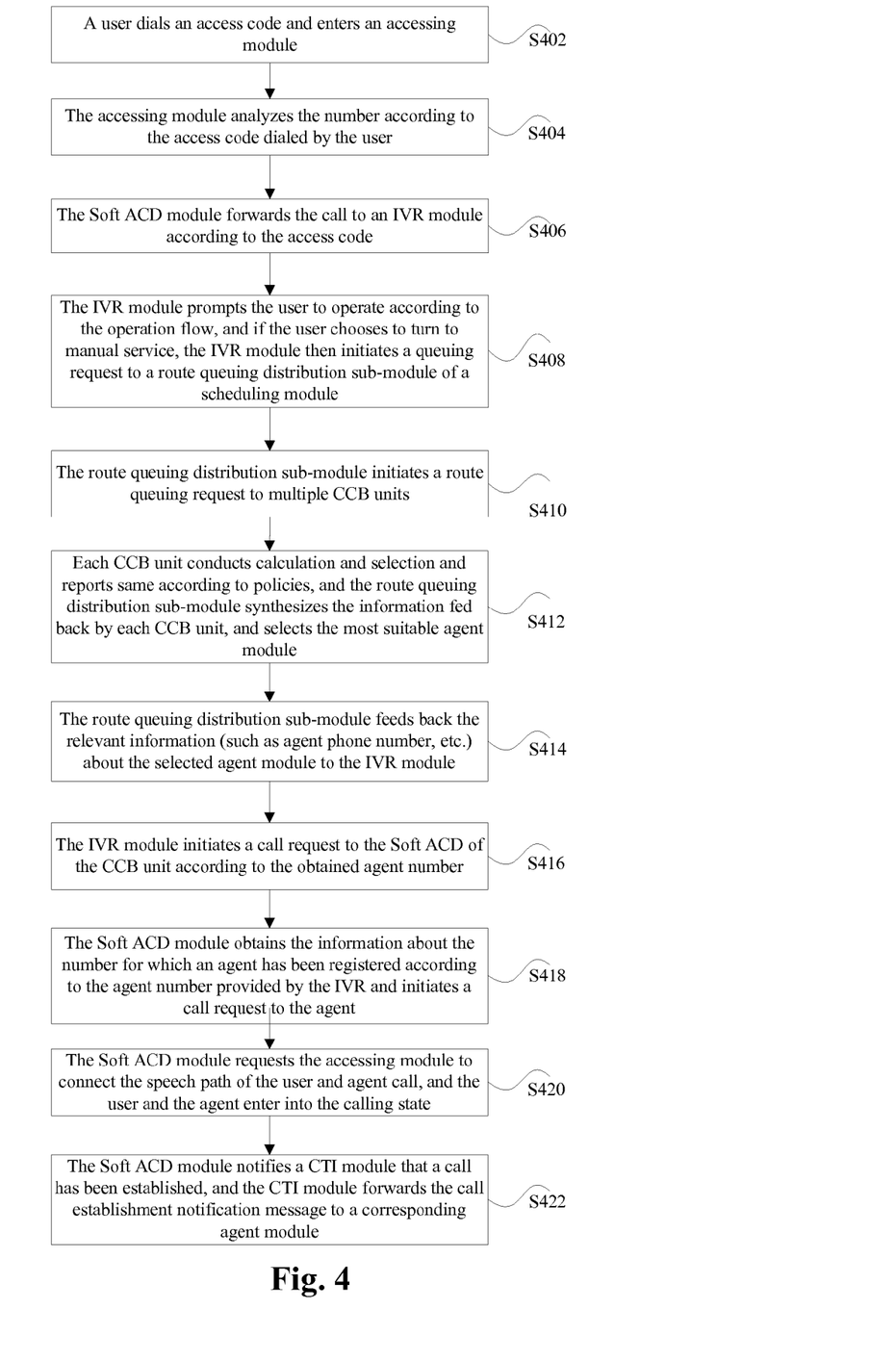
FIG. 4 is a flow chart that a user calls and requests queuing up to get served by an agent according to a preferred embodiment of the disclosure.
Figure 5:
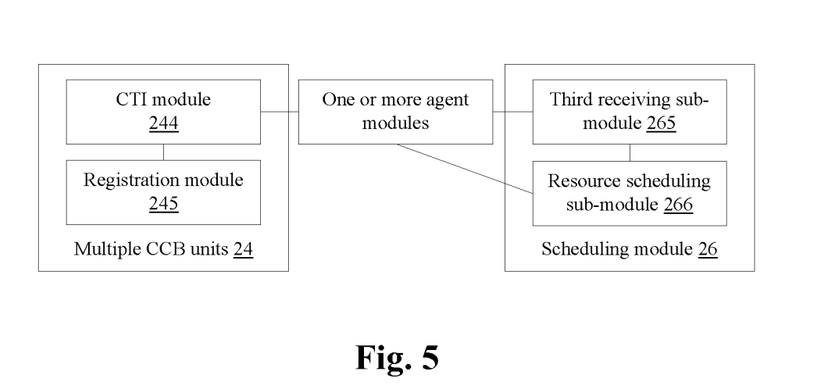
FIG. 5 is block diagram II of the structure of a calling center system according to a preferred embodiment of the disclosure.
Figure 6:
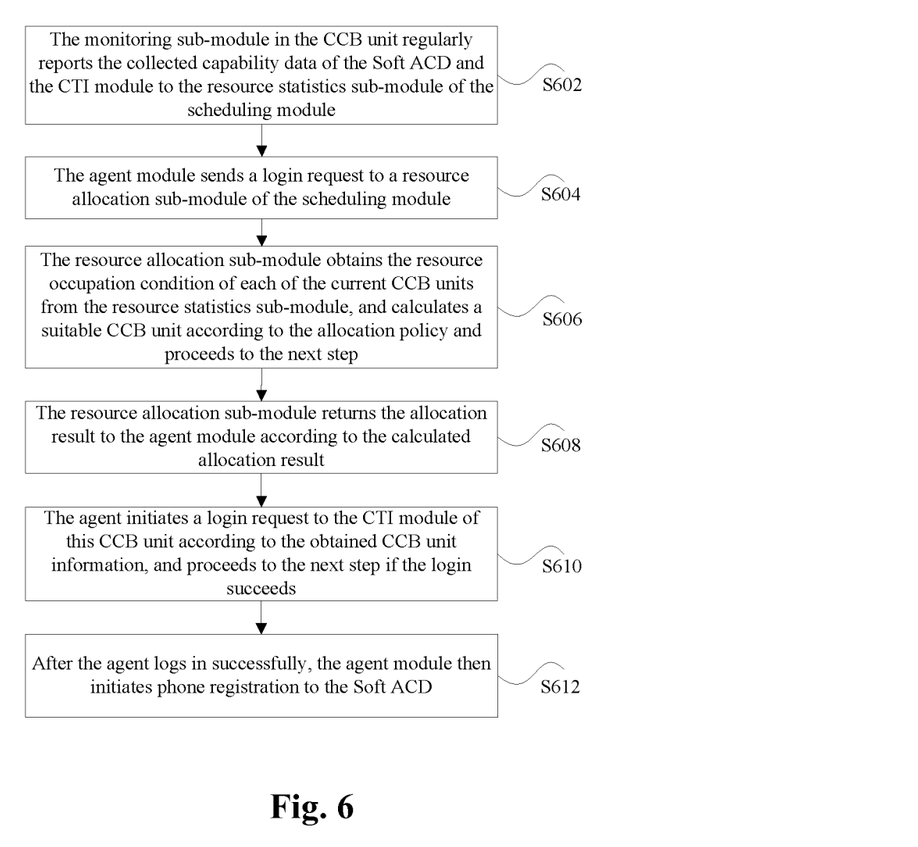
FIG. 6 is a login flow chart of an agent according to a preferred embodiment of the disclosure.

In order to further enhance the reliability of the system, an embodiment of the disclosure also optimizes the flow that a user calls and requests queuing up to get served by an agent (as shown in FIGS. 3 and 4), and the login flow of the agents (as shown in FIGS. 5 and 6), which will be respectively described in detail below.

FIG. 3 is block diagram I of the structure of a calling center system according to a preferred embodiment of the disclosure. As shown in FIG. 3, the scheduling module 26 includes a first selection sub-module 261, a first sending sub-module 262, a first receiving sub-module 263, and a second selection sub-module 264. Each CCB unit of the multiple CCB units 24 includes a second receiving sub-module 241, a third selection sub-module 242, and a second sending sub-module 243. The structure thereof is described in detail below.

The scheduling module 26 includes: a first selection sub-module 261, configured to select, according to the capability data of the multiple CCB units 24, one or more CCB units from the multiple CCB units 24 to perform the operation of selecting one agent module for serving the user call; a first sending sub-module 262, which is coupled with the first selection sub-module 261 and is configured to respectively send to the one or more CCB units selected by the first selection sub-module 261 a route queuing request corresponding to the user call; a first receiving sub-module 263, configured to receive a route queuing result from each CCB unit of the one or more CCB units, wherein the route queuing result of each CCB unit includes the agent module for serving the user call selected by the CCB unit from the multiple agent modules corresponding to the CCB unit; and a second selection sub-module 264, which is coupled with the first receiving sub-module 263 and is configured to select, from the one or more agent modules selected by the one or more CCB units which are included in route queuing results received by the first receiving sub-module 263, one agent module to serve the user call.

The second receiving sub-module 241 is coupled with the first sending sub-module 262 and is configured to receive a route queuing request from the first sending sub-module 262 of the scheduling module; the third selection sub-module 242 is coupled with the second receiving sub-module 241 and is configured to select, according to the route queuing request received by the second receiving sub-module 241, one agent module for serving the user call from the multiple agent modules corresponding to the CCB unit; and the second sending sub-module 243 is configured to send a route queuing result to the first receiving sub-module 263 of the scheduling module 26, wherein the route queuing result includes the selected agent module.

In this preferred embodiment, considering the situation where a large number of user calls erupt simultaneously, route queuing can be adopted enhance the reliability of the system and improve user experience. Meanwhile, the scheduling of the CCB units by the scheduling module can achieve the disaster recovery function of the calling center system, and when an exception occurs on a CCB module, the scheduling module is capable of scheduling agents and calls to other normal CCB modules in time.

Preferably, the calling center system further includes an IVR module 28 configured to initiate a route queuing request to the scheduling module according to the user call.

FIG. 4 is a flow chart that a user calls and requests queuing up to get served by an agent according to a preferred embodiment of the disclosure. This flow can be achieved on the basis of the calling center system shown in FIG. 3, and the flow, as shown in FIG. 4, includes the following step S402 to step S422.

Step S402, a user dials an access code and enters the accessing module.

Step S404, the accessing module analyzes the number according to the access code dialed by the user, and if it is an intelligent call, the accessing module then routes the call to a specified Soft ACD according to the routing policy (such as load sharing policy, polling policy).

Step S406, the Soft ACD module forwards the call to the IVR module according to the access code.

Step S408, the IVR module prompts the user to operate according to an operation flow, and if the user chooses to turn to manual service, the IVR module then initiates a queuing request to a route queuing distribution sub-module of a scheduling module.

Step S410, the route queuing distribution sub-module initiates a route queuing request to multiple CCB units according to the resource condition of each CCB unit obtained by a resource statistics sub-module and the route queuing policy.

Step S412, after receiving the route request, each CCB unit conducts calculation and selection according to policies (such as first-come-first-service policy), and reports the route result to the route queuing distribution sub-module of the scheduling module, and the route queuing distribution sub-module synthesizes the information fed back by each CCB unit, selects the most suitable agent module and proceeds to the next step.

Step S414, the route queuing distribution sub-module feeds back the relevant information (such as agent phone number, etc.) about the selected agent module to the IVR module.

It should be noted that the above-mentioned step S408 to step S414 are key steps of the flow that a user calls and requests queuing up to get served by an agent.

Step S416, the IVR module initiates a call request to the Soft ACD of the CCB unit according to the obtained agent number.

Step S418, the Soft ACD module obtains the information about the number for which an agent has been registered according to the agent number provided by the IVR, and initiates a call request to this agent, and if the call gets through, then the next step is proceeded; and if the call does not get through, then the IVR is notified of the call failure.

Step S420, the Soft ACD module requests the accessing module to connect the call channel between the user and the agent, and the user and the agent enter a calling state.

Step S422, the Soft ACD module notifies a CTI module that a call has been established, and the CTI module forwards a call establishment notification message to a corresponding agent module (this notification message may carry the number information about the calling user and other path-related data information, and the agent module can display more information on an agent interface or further obtain more information according to the promption).

FIG. 5 is block diagram II of the structure of a calling center system according to a preferred embodiment of the disclosure. As shown in FIG. 5, the scheduling module 26 includes a third receiving sub-module 265 and a resource scheduling sub-module 266. Each CCB unit of the multiple CCB units 24 includes a CTI module 244 and a registration module 245. The structure thereof is described in detail below.

The third receiving sub-module 265 is configured to receive a login request from one or more agent modules in the multiple agent modules; and the resource scheduling sub-module 266 is coupled with the third receiving sub-module 265 and is configured to select, according to the capability data, one CCB unit from the multiple CCB units to serve the login request received by the third receiving sub-module 265.

The CTI module 244 is configured to receive the login request from the one or more agent modules; and the registration module 245 is coupled with the CTI module 244 and is configured to register the one or more agent modules.

This preferred embodiment describes that an optimal CCB unit is selected by the scheduling module 26, and the CCB unit is used to register the one or more agent modules, so as to ensure the load balancing of multiple CCB units and thereby enhance the reliability of the system.

Preferably, each CCB unit in the multiple CCB units 24 includes a monitoring sub-module 246 and a third sending sub-module 247. The structure thereof is described in detail below.

The monitoring sub-module 246 is configured to monitor capability data; and the third sending sub-module 247 is coupled with the monitoring sub-module 246 and is configured to send the capability data monitored by the monitoring sub-module 246 to the scheduling module 26.

It should be noted that the capability data may include the resource condition (e.g., information like CPU, memory, online users, etc.) reported by the Soft ACD in the CCB unit, and may also include the resource state (e.g., information like CPU, memory, number of online agents, number of current queues, idle agents, etc.) reported by the CTI module in the CCB unit.

FIG. 6 is a login flow chart of an agent according to a preferred embodiment of the disclosure. This flow can be achieved on the basis of the calling center system shown in FIG. 5, and the flow, as shown in FIG. 6, includes the following step S602 to step S612.

Step S602, the monitoring sub-module in the CCB unit regularly reports the capability data collected from the Soft ACD and the CTI module to the resource statistics sub-module of the scheduling module.

Step S604, the agent module sends a login request to a resource allocation sub-module of the scheduling module.

Step S606, the resource allocation sub-module obtains the resource occupation condition of each of the current CCB units from the resource statistics sub-module, and calculates to select one suitable CCB unit according to the allocation policy (either according to the CPU occupation condition or according to various policies such as the number of online agents of each CTI, etc.) and proceeds to the next step.

Step S608, the resource allocation sub-module returns the allocation result to the agent module according to the calculated allocation result, and if the allocation succeeds, the next step is proceeded, and if the allocation fails, then the agent module prompts the login failure.

Step S610, the agent initiates a login request to the CTI module of this CCB unit according to the obtained CCB unit information, and proceeds to the next step if the login succeeds.

Step S612, after the agent logs in successfully, the agent module then initiates phone registration to the Soft ACD.

The implementation process of the embodiments of the disclosure is described in detail with reference to the embodiments below.

Figure 7:
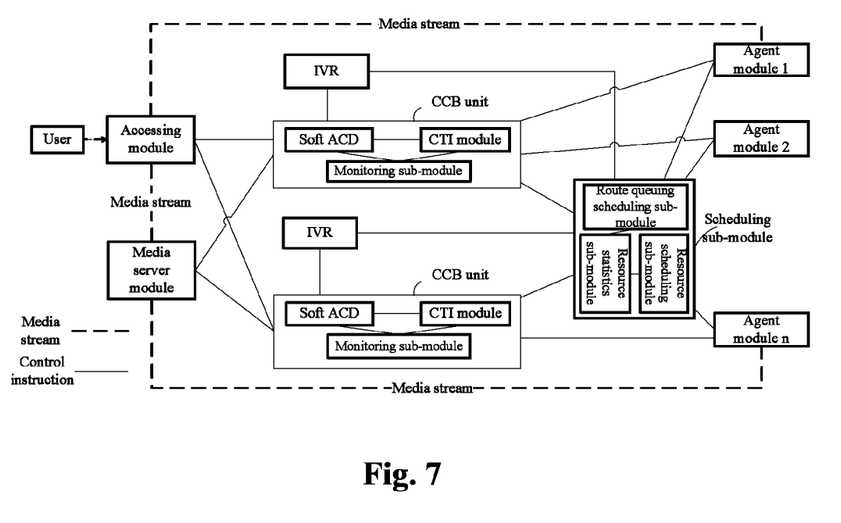
FIG. 7 is a schematic diagram of a calling center system according to a preferred embodiment of the disclosure.

FIG. 7 is a schematic diagram of a calling center system according to a preferred embodiment of the disclosure. As shown in FIG. 7, the calling center system of the multiple CCB units in an embodiment of the disclosure consists of six types of modules under normal circumstances: accessing module, IVR module, media server, CCB unit, scheduling module and agent module.

Under normal circumstances, the accessing module and the Soft ACD module adopt the SIP protocol therebetween; the accessing module and the media server module adopt the SIP protocol therebetween; the IVR module and the multiple CCB units adopt the SIP protocol therebetween; the IVR module and the scheduling module adopt a private protocol therebetween; and the IVR and the media server module adopt the MGCP protocol therebetween. The CCB units may increase linearly as required and each CCB unit consists of a Soft ACD, a CTI module, and a monitoring sub-module. The Soft ACD and the CTI module adopt the CSTA protocol therebetween, and the Soft ACD and the monitoring sub-module adopt a private protocol therebetween; the CTI module and the monitoring sub-module adopt a private protocol therebetween; and the CTI module and the scheduling module adopt a private protocol therebetween. The scheduling module consists of a route queuing scheduling sub-module, a resource statistics sub-module and a resource scheduling sub-module. The resource statistics sub-module and the route queuing scheduling sub-module adopt a private protocol therebetween; the resource statistics sub-module and the resource scheduling sub-module adopt a private protocol therebetween; the scheduling module and the CCB units adopt a private protocol therebetween; the scheduling module and the agent modules adopt a private protocol therebetween; the media server and the CCB units adopt the MGCP protocol therebetween. Media stream interaction exists between the media server and the accessing module and agent modules.

The function of each module is as follows. The accessing module is responsible for the access of various types of user calls, the connection of the call between the user and agent, and the media stream negotiation and interaction with the media server module. The IVR module is responsible for the automatic service flow processing, wherein an ingress to the flow of turning to the manual service is provided in the automatic service flow, a user can choose to turn to the manual service in the flow, and if the user chooses to turn to the manual service, then the IVR module initiates a route queuing request to the scheduling module, and initiates a call request to the Soft ACD module.

As shown in FIG. 7, a CCB unit consists of a Soft ACD, a CTI module and a monitoring sub-module, wherein the Soft ACD is responsible for accepting the SIP registration of an agent module, initiating an SIP call to the agent module according to a request of the IVR, and regularly reporting resource information, such as CPU, memory, number of online users, etc., to the monitoring sub-module; the CTI module is responsible for accepting a login request from the agent module, selecting a suitable agent from idle agents according to information like call priority and level of the user, etc., conducting reasonable queuing management according to the information like priority and level of the calling user, etc., and regularly reporting resource information such as CPU, memory, number of online agents, number of idle agents, number of queues, etc. to the monitoring sub-module; and the monitoring sub-module is responsible for collecting all the capability data of the Soft ACD and the CTI module and reporting same to the scheduling module.

As shown in FIG. 7, the scheduling module consists of a resource statistics sub-module, a CTI module and a resource scheduling sub-module. The resource statistics sub-module is responsible for receiving and managing all the capability data reported by each CCB unit, and providing policy-based data for the route queuing distribution sub-module and the resource scheduling sub-module. The resource scheduling sub-module is responsible for receiving login requests from the agent modules in a centralized manner, and allocating one current CCB unit as the CCB unit for agent module login according to the capability resource (e.g., CPU occupation+number of online agents) occupation condition of each CCB unit, wherein CCB units with low CPU occupation and few online agents are allocated preferentially. The route queuing scheduling sub-module is responsible for receiving a route queuing request from the IVR, initiating the route queuing request to all the CCB units, and conducting preferred selection according to the route queuing result returned by all the CCB units, wherein the first-return-first-select policy can be used.

As shown in FIG. 7, the agent module is responsible for initiating a login request to the CCB unit, initiating SIP registration to the Soft ACD module, accepting a voice call of the Soft ACD module, and providing a manual service to the user, such as bill enquiry, complaint, suggestion, etc.

The calling center system which can linearly expand the agents thereof may include two processing flows: the first one is the agent login flow; and the second one is the flow that a user requests queuing up to get served by an agent.

Figure 8:
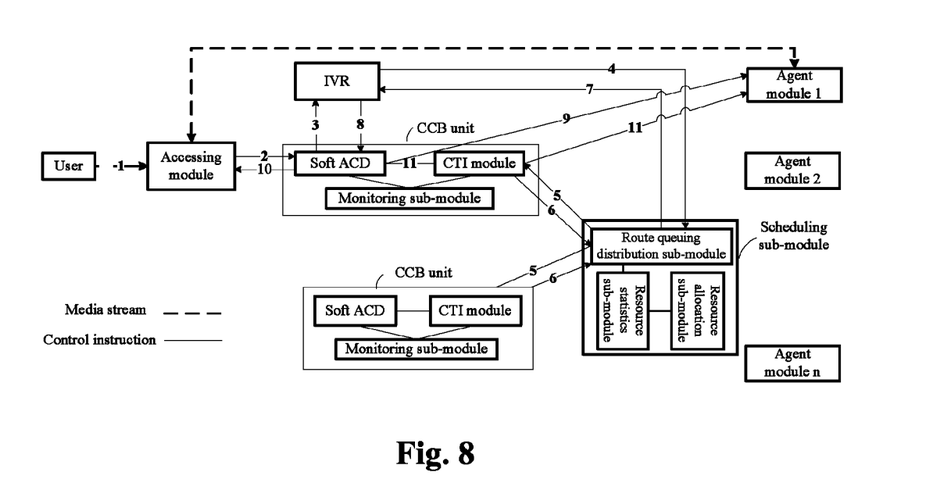
FIG. 8 is a schematic diagram of the flow that a user calls and requests queuing up to get served by an agent according to a preferred embodiment of the disclosure.

FIG. 8 is a schematic diagram of the flow of a user calls and requests queuing up to get served by an agent according to a preferred embodiment of the disclosure.

Step one, a user dials an access code and enters the accessing module.

Step two, the accessing module analyzes the number according to the access code dialed by the user, and if it is an intelligent call, then the access number is analyzed, and the call can be routed to the Soft ACD module using load sharing policy or polling policy.

Step three, the Soft ACD module forwards the call to an automatic service IVR module according to the access code.

Step four, the IVR module prompts the user to operate according to an operation flow, and if the user chooses to turn to the manual service flow, the IVR module then initiates a queuing request to the route queuing distribution sub-module of the scheduling module.

Step five, the route queuing distribution sub-module preferentially initiates a route queuing request to the CCB unit with low CPU occupation and few idle agents according to the resource occupation condition, such as CPU, number of idle agents, etc. of each CCB unit obtained by the resource statistics sub-module.

Step six, after receiving the route request, each CCB unit conducts idle agent selection according to a predefined route queuing policy (such as familiar route policy or first-come-first-service policy), and reports the selection result to the route queuing distribution sub-module of the scheduling module, and the route queuing distribution sub-module conducts comprehensive selection according to the information fed back by each CCB unit (such as familiar route policy or first-come-first-service policy), selects the most suitable agent module, and proceeds to the next step.

Step seven, the route queuing distribution sub-module feeds back the obtained phone number of the agent module to the IVR module.

Step eight, the IVR module initiates an SIP call request for this agent to the Soft ACD of the CCB unit according to the obtained agent number.

Step nine, the Soft ACD module initiates an SIP call to this agent number, and the agent automatically answers, and if the answer succeeds, then the next step is proceeded; if the call fails, then the IVR is notified of the call failure.

Step ten, the Soft ACD module initiates to the accessing module a request for connecting the channel of the user and agent call, and the user and the agent enter into the calling state.

Step eleven, the Soft ACD module notifies the CTI module that a call has been established, and the CTI module forwards the call establishment notification message to a corresponding agent module via the TSAPI interface, wherein this notification message carries the number information about the calling party, and the agent module queries the information about a corresponding number in the database according to the number of the calling party, and prompts the agent interface to display.

Figure 9:
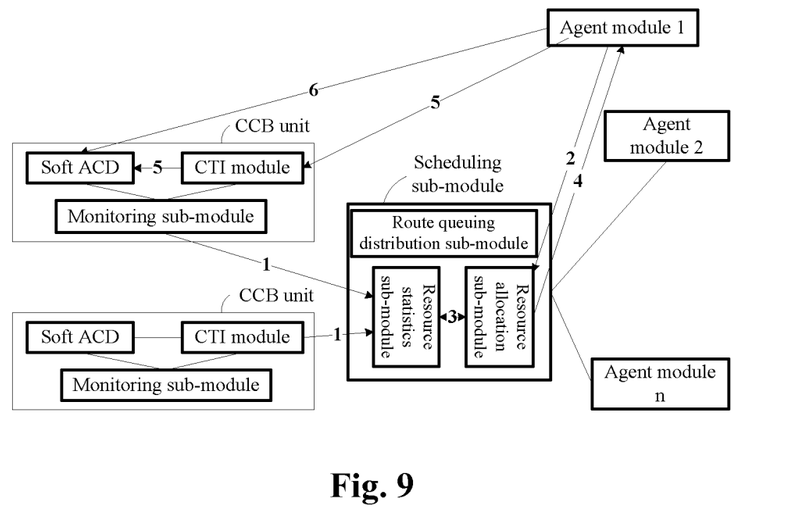
FIG. 9 is a schematic diagram of a login flow of an agent according to a preferred embodiment of the disclosure.

FIG. 9 is a schematic diagram of a login flow of an agent according to a preferred embodiment of the disclosure.

Step one, the monitoring sub-module in the CCB unit regularly reports the collected capability data of the Soft ACD and the CTI module, such as CPU, memory, number of online users, number of online agents, number of idle agents, number of queues, etc. to the resource statistics sub-module of the scheduling module.

Step two, the agent module sends a login request to the resource allocation sub-module of the scheduling module.

Step three, the resource allocation sub-module preferentially selects a CCB unit with low CPU occupation and few online agents according to the resource occupation condition of each of the current CCB units collected by the resource statistics sub-module, and proceeds to the next step.

Step four, the resource allocation sub-module returns the number of the CCB unit to the agent module and proceeds to the next step, and if the allocation fails, then an error code is returned, and the agent module prompts the login failure.

Step five, the agent module initiates a login request to the CTI module of the obtained CCB unit, and if it succeeds, then the next step is proceeded.

Step six, after the agent is successfully registered, the agent module initiates SIP registration to the Soft ACD, and at this point, the agent login process completes.

It should be noted that the steps shown in the flow chart of the drawings can be executed, for example, in a computer system with a set of instructions executable by a computer, and in addition, a logic order is shown in the flow chart, but the shown or described steps can be executed in a different order under some conditions.

Figure 10:
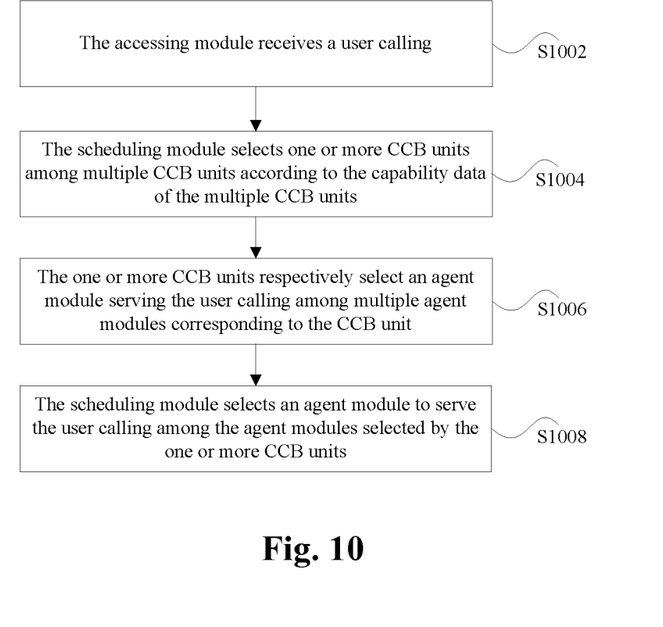
FIG. 10 is a flow chart of a calling processing method of a calling center system according to an embodiment of the disclosure.

The embodiments of the disclosure provide a calling processing method for a calling center system, and the calling processing method for a calling center system can be achieved on the basis of the above-mentioned calling center system. FIG. 10 is a flow chart of a calling processing method for a calling center system according to an embodiment of the disclosure, which as shown in FIG. 10 includes the following step S1002 to step S1008.

Step S1002, an accessing module receives a user call.

Step S1004, a scheduling module selects one or more CCB units among multiple CCB units according to the capability data of the multiple CCB units.

Step S1006, the one or more CCB units respectively select an agent module serving the user call among multiple agent modules corresponding to the CCB unit, wherein each agent module of the multiple agent modules is used for serving the user call.

Step S1008, the scheduling module selects an agent module to serve the user call among the agent modules selected by the one or more CCB units.

Preferably, before the one or more CCB units respectively select one agent module for serving the user call from the multiple agent modules corresponding to the CCB unit, the above-mentioned method further includes: the one or more CCB units receive from the scheduling module a routing queue request corresponding to the user call; and after the one or more CCB units respectively select one agent module for serving the user call from the multiple agent modules corresponding to the CCB unit, the above-mentioned method further includes: each CCB unit of the one or more CCB units sends a routing queue result to the scheduling module, wherein the routing queue result includes the agent module for serving the user call selected by the CCB unit.

Preferably, before the one or more CCB units receive from the scheduling module a routing queue request corresponding to the user call, the above-mentioned method further includes: an IVR module initiates a routing queue request to the scheduling module according to the user call.

Preferably, before the scheduling module selects one or more CCB units from the multiple CCB units according to the capability data of the multiple CCB units, the above-mentioned method further includes: the scheduling module receives the capability data monitored by each CCB unit among the multiple CCB units.

It should be noted that the calling processing method of a calling center system described in the device embodiment corresponds to the above-mentioned calling center system, the particular implementation process of which has been described in detail in the method embodiment and will not be described here again.

In summary, according to the above-mentioned embodiments of the disclosure, a calling center system and a calling processing method thereof are provided. In the disclosure, the number of the multiple CCB units can be expanded or reduced arbitrarily as required. Meanwhile, through the scheduling of the CCB units by a scheduling module, the parallel service of the multiple CCB units can also enhance the reliability of the system.

Obviously, those skilled in the art shall understand that the above-mentioned modules and steps of the disclosure can be realized by using general purpose calculating device, can be integrated in one calculating device or distributed on a network which consists of a plurality of calculating devices. Alternatively, the modules and the steps of the disclosure can be realized by using the executable program code of the calculating device. Consequently, they can be stored in the storing device and executed by the calculating device, or they are made into an integrated circuit module respectively, or a plurality of modules or steps thereof are made into one integrated circuit module. In this way, the disclosure is not restricted to any particular hardware and software combination.

The descriptions above are only the preferred embodiments of the disclosure, which are not used to restrict the disclosure, and for those skilled in the art, the disclosure may have various changes and variations. Any amendments, equivalent substitutions, improvements, etc. made within the principle of the disclosure are all included in the scope of the protection of the disclosure.

What is claimed is:

1. A calling center system, comprising:
    an accessing module, configured to receive a user call;
    multiple cell control block (CCB) units, wherein each CCB unit comprises a soft automatic call distribution (Soft ACD) and a computer telephony integration (CTI) module, and each CCB unit is configured to select one agent module for serving the user call from multiple agent modules corresponding to the CCB unit, wherein each agent module of the multiple agent modules is configured to serve a user call; and
    a scheduling module, configured to select, according to capability data of the multiple CCB units, one or more CCB units from the multiple CCB units to perform the operation of selecting one agent module for serving the user call, and select one agent module from one or more agent modules selected by the one or more CCB units to serve the user call, wherein the capability data comprises resource condition reported by the Soft ACD in each of the multiple CCB units, and the resource condition comprises: Central processing unit(CPU), memory, and online users.

2. The calling center system as claimed in claim 1, wherein the scheduling module comprises:
    a first selection sub-module, configured to select, according to the capability data of the multiple CCB units, the one or more CCB units from the multiple CCB units to perform the operation of selecting one agent module for serving the user call;
    a first sending sub-module, configured to respectively send to the one or more CCB units a route queuing request corresponding to the user call;
    a first receiving sub-module, configured to receive a route queuing result from each CCB units of the one or more CCB units, wherein the route queuing result from each CCB unit comprises the agent module for serving the user call selected by the CCB unit from the multiple agent modules corresponding to the CCB unit; and
    a second selection sub-module, configured to select one agent module from the one or more agent modules selected by the one or more CCB units to serve the user call.

3. The calling center system as claimed in claim 2, further comprising an interactive voice response (IVR) module configured to initiate a route queuing request to the scheduling module according to the user call.

4. The calling center system as claimed in claim 1, wherein the scheduling module comprises:
    a third receiving sub-module, configured to receive a login request from one or more agent modules among the multiple agent modules; and
    a resource scheduling sub-module, configured to select, according to the capability data, one CCB unit from the multiple CCB units to serve the login request.

5. The calling center system as claimed in claim 1, wherein each CCB unit of the multiple CCB units comprises:
    a monitoring sub-module, configured to monitor capability data; and
    a third sending sub-module, configured to send the capability data to the scheduling module.

6. The calling center system as claimed in claim 2, wherein each CCB unit of the multiple CCB units comprises:
    a second receiving sub-module, configured to receive the route queuing request from the scheduling module;
    a third selection sub-module, configured to select, according to the route queuing request, one agent module for serving the user call from the multiple agent modules corresponding to the CCB unit; and
    a second sending sub-module, configured to send the route queuing result to the scheduling module, wherein the route queuing result includes the agent module selected from the multiple agent modules.

7. The calling center system as claimed in claim 2, wherein each CCB unit of the multiple CCB units comprises:
    a monitoring sub-module, configured to monitor capability data; and
    a third sending sub-module, configured to send the capability data to the scheduling module.

8. The calling center system as claimed in claim 3, wherein each CCB unit of the multiple CCB units comprises:
    a monitoring sub-module, configured to monitor capability data; and
    a third sending sub-module, configured to send the capability data to the scheduling module.

9. The calling center system as claimed in claim 4, wherein each CCB unit of the multiple CCB units comprises:
    a monitoring sub-module, configured to monitor capability data; and
    a third sending sub-module, configured to send the capability data to the scheduling module.

10. The calling center system as claimed in claim 1, wherein each CCB unit of the multiple CCB units comprises:
- a monitoring sub-module, configured to monitor capability data; and
- a third sending sub-module, configured to send the capability data to the scheduling module.

11. The calling center system as claimed in claim 6, wherein each CCB unit of the multiple CCB units comprises:
- a monitoring sub-module, configured to monitor capability data; and
- a third sending sub-module, configured to send the capability data to the scheduling module.

12. A calling processing method of a calling center system, wherein the method comprises:
- an accessing module receiving a user call;
- a scheduling module selecting one or more cell control block (CCB) units from multiple CCB units according to capability data of the multiple CCB units, wherein each CCB unit comprises a soft automatic call distribution (Soft ACD) and a computer telephony integration (CTI) module, and the capability data comprises resource condition reported by the Soft ACD in each of the multiple CCB units, and the resource condition comprises: Central Processing unit(CPU), memory, and online users;
- each CCB unit of the one or more CCB units respectively selecting one agent module for serving the user call from multiple agent modules corresponding to the CCB unit, wherein each agent module of the multiple agent modules is configured to serve a user call; and
- the scheduling module selecting one agent module from one or more agent modules selected by the one or more CCB units to serve the user call.

13. The method as claimed in claim 12, wherein
before each CCB unit of the one or more CCB units respectively selects one agent module for serving the user call from multiple agent modules corresponding to the CCB unit, the method further comprises: the one or more CCB units receiving from the scheduling module a route queuing request corresponding to the user call; and
after each CCB unit of the one or more CCB units respectively selects one agent module for serving the user call from multiple agent modules corresponding to the CCB unit, the method further comprises: each CCB unit of the one or more CCB units sending a route queuing result to the scheduling module, wherein the route queuing result from each CCB unit comprises the agent module for serving the user call selected by the CCB unit.

14. The method as claimed in claim 13, wherein before the one or more CCB units receives from the scheduling module a route queuing request corresponding to the user call, the method further comprises: an interactive voice response (IVR) module initiating a route queuing request to the scheduling module according to the user call.

15. The method as claimed in claim 12, wherein before the scheduling module selects the one or more CCB units from the multiple CCB units according to the capability data of the multiple CCB units, the method further comprises: the scheduling module receiving capability data monitored by each CCB unit of the multiple CCB units.

16. The method as claimed in claim 13, wherein before the scheduling module selects the one or more CCB units from the multiple CCB units according to the capability data of the multiple CCB units, the method further comprises: the scheduling module receiving capability data monitored by each CCB unit of the multiple CCB units.

17. The method as claimed in claim 14, wherein before the scheduling module selects the one or more CCB units from the multiple CCB units according to the capability data of the multiple CCB units, the method further comprises: the scheduling module receiving capability data monitored by each CCB unit of the multiple CCB units.

* * * * *